(12) United States Patent
Shin et al.

(10) Patent No.: US 11,524,404 B2
(45) Date of Patent: Dec. 13, 2022

(54) ROBOT SYSTEM AND CONTROL METHOD THEREOF

(71) Applicant: LG ELECTRONICS INC., Seoul (KR)

(72) Inventors: Chulho Shin, Seoul (KR); Sunggil Park, Seoul (KR); Changeui Shin, Seoul (KR); Seyul Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 272 days.

(21) Appl. No.: 16/843,698

(22) Filed: Apr. 8, 2020

(65) Prior Publication Data
US 2021/0101283 A1     Apr. 8, 2021

(30) Foreign Application Priority Data

Oct. 2, 2019 (KR) .................. 10-2019-0122087

(51) Int. Cl.
*B25J 9/16* (2006.01)
*B25J 9/00* (2006.01)
*B25J 19/02* (2006.01)

(52) U.S. Cl.
CPC .......... *B25J 9/1676* (2013.01); *B25J 9/0003* (2013.01); *B25J 9/161* (2013.01); *B25J 9/163* (2013.01); *B25J 9/1674* (2013.01); *B25J 9/1697* (2013.01); *B25J 19/02* (2013.01); *B25J 19/023* (2013.01)

(58) Field of Classification Search
CPC ........ B25J 9/1676; B25J 9/0003; B25J 9/161; B25J 9/163; B25J 9/1674; B25J 9/1697; B25J 19/02; B25J 19/023; B25J 19/06; B25J 9/1602; B25J 9/1651; B25J 9/1664; B25J 11/0045; G05B 2219/40201; G05B 2219/40203
See application file for complete search history.

(56) References Cited

U.S. PATENT DOCUMENTS

| | | | | |
|---|---|---|---|---|
| 2003/0076224 A1* | 4/2003 | Braune | .......... | F16P 3/142 340/500 |
| 2014/0135984 A1* | 5/2014 | Hirata | .......... | B25J 19/06 700/255 |
| 2017/0157783 A1* | 6/2017 | Ogawa | .......... | F16P 3/003 |
| 2017/0197313 A1* | 7/2017 | Nishino | .......... | A61B 5/02055 |
| 2017/0368691 A1* | 12/2017 | Li | .......... | G05D 1/0221 |
| 2018/0121593 A1* | 5/2018 | Anderson | .......... | H01L 27/0207 |

(Continued)

*Primary Examiner* — Nicholas Kiswanto
*Assistant Examiner* — Dylan Brandon Mooney
(74) *Attorney, Agent, or Firm* — Birch, Stewart, Kolasch & Birch, LLP

(57) ABSTRACT

A robot system can include a main body; a manipulator installed on the main body; a sensor configured to detect an object approaching a restricted region including the manipulator; a camera configured to monitor the restricted region and the object approaching the restricted region; a storage configured to store a material for an operation of the manipulator, the storage including an inlet for receiving the material; a remaining amount sensor configured to detect an amount of the material remaining in the storage; and a controller configured to change the restricted region based on at least one of a result of detection of the remaining amount sensor and image information of the camera, and in response to the sensor detecting that the object is within the restricted region, stop manipulation of the manipulator.

18 Claims, 9 Drawing Sheets

(56) References Cited

U.S. PATENT DOCUMENTS

| | | | |
|---|---|---|---|
| 2018/0164828 A1* | 6/2018 | Dumitras | G01G 19/52 |
| 2019/0084158 A1* | 3/2019 | Atherton | B25J 9/1676 |
| 2020/0130170 A1* | 4/2020 | Yu | B25J 9/041 |
| 2020/0368909 A1* | 11/2020 | Sejimo | B25J 9/1676 |

* cited by examiner ial stored in the storage is greater than the set value and the operator moves out of the first region.

The controller may operate the manipulator at a first speed in the state in which the restricted region is the first region, and the controller may operate the manipulator at a second speed lower than the first speed in a state in which the restricted region is the second region.

The controller may limit a manipulation range of the manipulator to the second region in a state in which the restricted region is the second region.

The controller may divide a region defined by excluding the second region from the first region to set a plurality of outer division regions. The controller may divide a region defined by excluding a third region smaller than the second region and including the manipulator from the second region to set a plurality of inner division regions. In a state in which the restricted region is the second region, when the operator is positioned in one outer division region, the controller may exclude one inner division region neighboring the one outer division region from a manipulation range of the manipulator.

In the state in which the restricted region is the first region, the controller may change the restricted region to a third region smaller than the second region when a set time elapses after the manipulator starts manipulation and the person approaching the first region is verified to be an authenticated operator through the camera.

In a state in which the restricted region is the third region, the controller may change the restricted region to the first region when the operator moves out of the first region.

In a state in which the restricted region is the third region, the controller may limit a manipulation range of the manipulator to the second region.

The controller may change the third region in real time according to movement of the manipulator.

The controller may divide a region defined by excluding the third region from the second region to set a plurality of division regions, and when the operator is positioned in one division region in a state in which the restricted region is the third region, the controller may exclude the one division region from a manipulation range of the manipulator.

The controller may operate the manipulator at a first speed in the state in which the restricted region is the first region. The controller may operate the manipulator at a second speed lower than the first speed when a workstand or the storage is positioned in the one division region in a state in which the restricted region is the third region. The controller may operate the manipulator at a third speed lower than the second speed when the workstand or the storage is positioned out of the one division region in the state in which the restricted region is the third region.

According to another embodiment of the present disclosure, a control method of a robot system includes setting a first region including a manipulator and an inlet of a storage configured to store a material to a restricted region, stopping the manipulator when a person or an obstacle invades the first region in a state in which the restricted region is the first region, changing the restricted region to a second region smaller than the first region and positioned inward from the inlet of the storage when a remaining amount of the material stored in the storage is less than a set value and the person approaching the first region is verified to be an authenticated operator through a camera in the state in which the restricted region is the first region, and stopping the manipulator when the person or the obstacle invades the second region in a state in which the restricted region is the second region.

ROBOT SYSTEM AND CONTROL METHOD THEREOF

CROSS-REFERENCE TO RELATED APPLICATIONS

This application claims the benefit of priority under 35 U.S.C. § 119 to Korean Patent Application No. 10-2019-0122087, filed on Oct. 2, 2019 in the Republic of Korea, the entirety of which is incorporated herein by reference.

BACKGROUND

The present disclosure relates to a robot system including a manipulator and a control method thereof.

In general, a machine that performs similar tasks to the human using an electrical or magnetic action is referred to as a robot. Recently, robots have been used in various fields by virtue of the development of control technologies, and may be, for example, an endobot, a home-help robot, a service robot, a remote aerospace robot, or hazardous materials robot. Such a robot performs an operation using a manipulator configured to move in a similar manner as an arm or a hand using an electrical or mechanical mechanism.

In particular, a home-help robot is configured by coupling a specific tool to the manipulator to perform a specific operation. For example, a cooking robot is configured by coupling various tools, such as a ladle, tongs, or a pot to perform cooking.

SUMMARY

An object of the present disclosure is to provide a robot system for preventing a manipulator from colliding with an object, such as a person or an obstacle.

Another object of the present disclosure is to provide a robot system for varying a restricted region depending on various situations and increasing operation efficiency of the manipulator.

According to an embodiment of the present disclosure, a robot system including a main body, a manipulator installed on the main body, a lidar sensor configured to detect a person or an obstacle that approaches a restricted region set to include the manipulator, a camera configured to monitor the restricted region and the person or the obstacle that approaches the restricted region, a storage configured to store a material required for an operation of the manipulator and having an inlet, a remaining amount sensor configured to detect an amount of the material stored in the storage, and a controller configured to change the restricted region based on a result of detection of the remaining amount sensor and/or image information of the camera and to stop manipulation of the manipulator when the lidar sensor detects the person or the obstacle that invades the restricted region.

The controller may set a first region including the inlet of the storage to the restricted region.

In a state in which the restricted region is the first region, the controller may change the restricted region to a second region smaller than the first region and positioned inward from the inlet of the storage when a remaining amount of the material stored in the storage is less than a set value and the person approaching the first region is verified to be an authenticated operator through the camera.

In a state in which the restricted region is the second region, the controller may change the restricted region to the first region when the remaining amount of the mater The method may further include dividing a region defined by excluding the second region from the first region to set a plurality of outer division regions, and dividing a region defined by excluding a third region smaller than the second region and including the manipulator from the second region to set a plurality of inner division regions. In the state in which the restricted region is the second region, when the operator is positioned in one outer division region, one inner division region neighboring the one outer division region may be excluded from a manipulation range of the manipulator.

The method may further include, in the state in which the restricted region is the first region, changing the restricted region to a third region smaller than the second region when a set time elapses after the manipulator starts manipulation and the person approaching the restricted region is verified to be an authenticated operator through the camera, and, in a state in which the restricted region is the third region, stopping the manipulator when the person or the obstacle invades the third region.

In the state in which the restricted region is the second region or the third region, a manipulation range of the manipulator may be limited to the second region.

The third region may be changed in real time according to movement of the manipulator.

The method may further include dividing a region defined by excluding the third region from the second region to set a plurality of division regions. In the state in which the restricted region is the third region, when the operator is positioned in one division region, the one division region may be excluded from a manipulation range of the manipulator.

The manipulator may be operated at a first speed in the state in which the restricted region is the first region. The manipulator may be operated at a second speed lower than the first speed in the state in which the restricted region is the second region. The manipulator may be operated at the second speed when a workstand or the storage is positioned in the one division region in the state in which the restricted region is the third region. The manipulator may be operated at a third speed lower than the second speed when the workstand or the storage is positioned out of the one division region in the state in which the restricted region is the third region.

DETAILED DESCRIPTION

Figure 1:
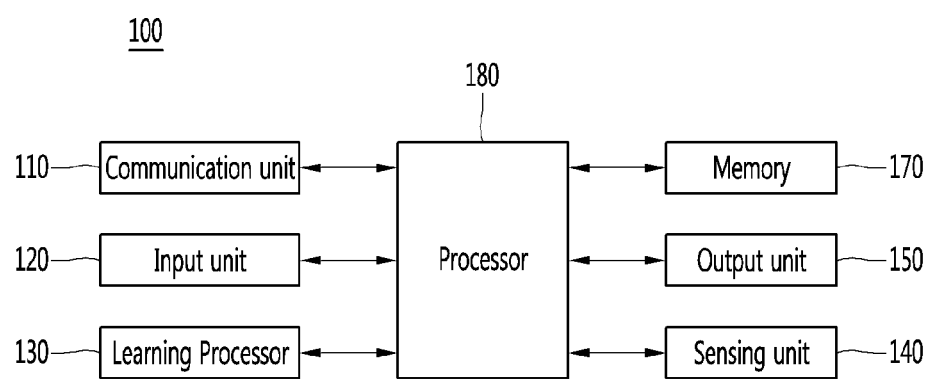
FIG. 1 illustrates an AI device including a robot according to an embodiment of the present disclosure.

Hereinafter, embodiments of the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations, such as moving a robot joint. In addition, a movable robot may include a wheel, a brake, a propeller, and the like in a driving unit, and may travel on the ground through the driving unit or fly in the air.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network infers when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), BLUETOOTH™, RFID (Radio Frequency Identification), Infrared Data Association (IrDA), ZIGBEE, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this situation, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device, such as the AI server 200. The collected history information may be used to update the learning model.

The processor 180 may control at least part of the components of AI device 100 to drive an application program stored in memory 170. Furthermore, the processor 180 may operate two or more of the components included in the AI device 100 in combination to drive the application program.

Figure 2:
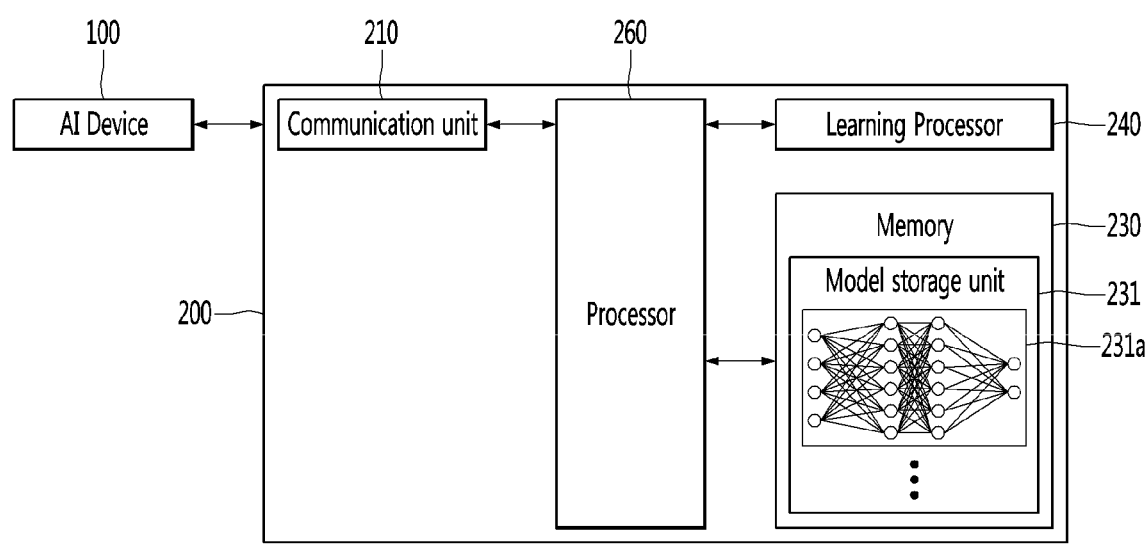
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device, such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device, such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
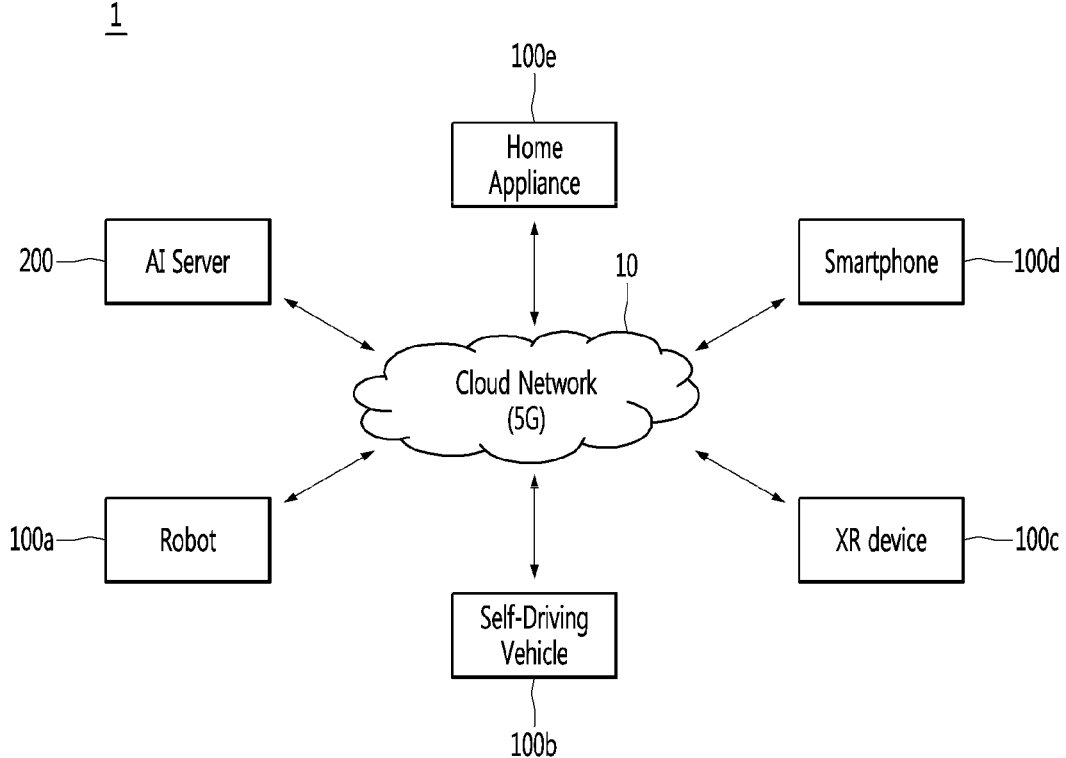
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device, such as the AI server 200.

At this time, the robot 100a may perform the operation by generating the result by directly using the learning model, but the sensor information may be transmitted to the external device, such as the AI server 200, and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects, such as walls and doors, and movable objects, such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

Figure 4:
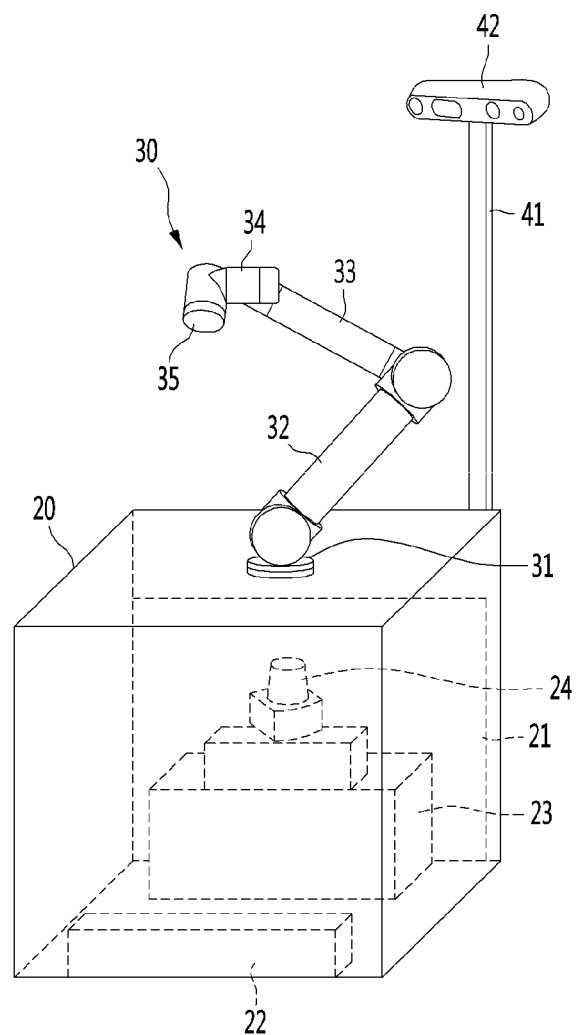
FIG. 4 is a schematic diagram showing a main body and a manipulator of a robot system according to an embodiment of the present disclosure.
Figure 5:
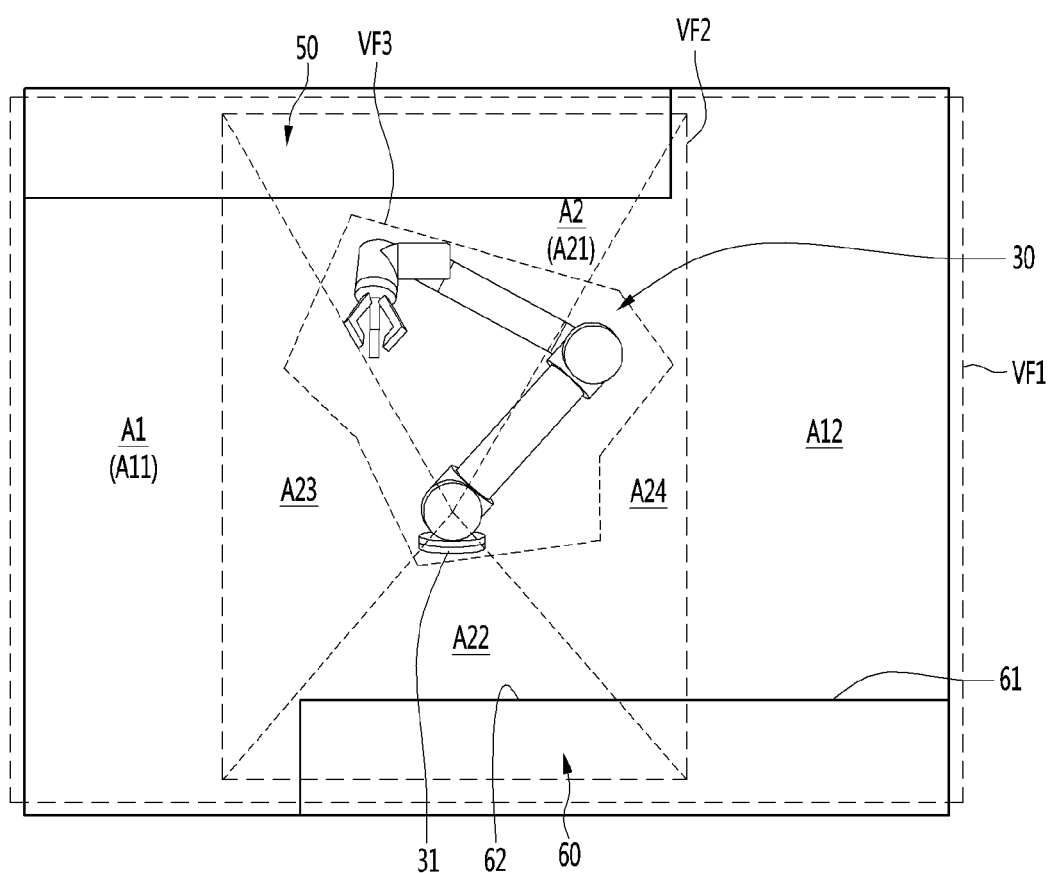
FIG. 5 is a diagram showing regions that are set around a robot system according to an embodiment of the present disclosure.
Figure 6:
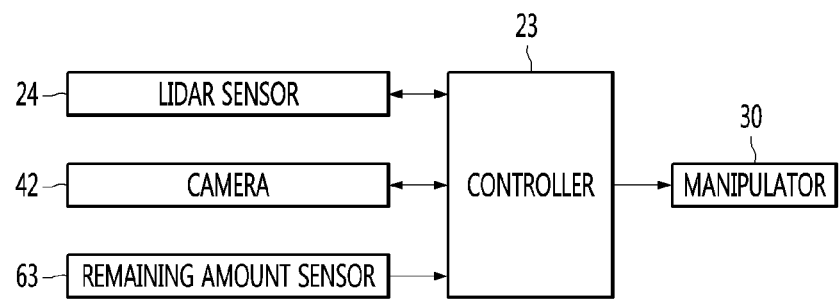
FIG. 6 is a control block diagram of a robot system according to an embodiment of the present disclosure.

FIG. 4 is a schematic diagram showing a main body and a manipulator of a robot system according to an embodiment of the present disclosure. FIG. 5 is a diagram showing regions that are set around a robot system according to an embodiment of the present disclosure. FIG. 6 is a control block diagram of a robot system according to an embodiment of the present disclosure.

The robot system according to an embodiment of the present disclosure may be included in the aforementioned robot 100*a*.

The robot system may include a main body 20, a manipulator 30, a lidar sensor 24, and a camera 42. The robot system may further include a storage 60.

The main body 20 may be accommodated on a bottom surface or a structure and may support the manipulator 30. The main body 20 may include a case having an internal space.

The main body 20 may include installed therein electronic components required for an operation of the robot system. For example, the main body 20 may include installed therein a power supply 22 for supplying power to the robot system. The main body 20 may include installed therein a controller 23 that will be described below.

The main body 20 may include a door 21 for opening and closing the internal space of the main body 20. An operator may open the door 21 to approach an internal part of the main body 20, and may perform maintenance on the electronic components installed in the main body 20.

The manipulator 30 may be installed on the main body 20, in more detail, on an upper surface of the main body 20. The manipulator 30 may perform an operation within a predetermined radius range based on the main body 20.

The manipulator 30 may include a base 31, a plurality of arms 32, 33, and 34, and a plurality of actuators for driving the plurality of arms 32, 33, and 34. An end arm of the plurality of arms 32, 33, and 34 may include a tool changer 35 to which a tool required to perform the operation of the manipulator 30 is selectively coupled. The configuration and type of the manipulator 30 and the tool changer 35 are not limited.

For example, the manipulator 30 may include the base 31 coupled to the upper surface of the main body 20, a first arm 32 that is connected to the base 31 and rotates around a vertical axis and a horizontal axis, a second arm 33 that is connected to an end of the first arm 32 and rotates in upward and downward directions, and a third arm 34 that is connected to an end of the second arm 33 and rotates around two horizontal axes that are perpendicular to each other. The tool changer 35 may be included in the third arm 34.

The lidar sensor 24 may detect the main body 20, the manipulator 30, and a person or an obstacle that approaches them. The lidar sensor 24 may detect the person or the obstacle that approaches a restricted region that will be described below.

The lidar sensor 24 may be included in the main body 20 but is not limited thereto. For example, the lidar sensor 24 may be installed at a separate support or wall configured outside the main body 20. The lidar sensor 24 may be configured in a plural number.

The camera 42 may monitor the main body 20, the manipulator 30, and a region around them. The camera 42 may monitor the restricted region to be described later and the object, such as a person or obstacle or other object, that approaches the restricted region. The camera 42 may include at least one of a tracking camera or a depth camera.

The camera 42 may be supported by a support 41 connected to the main body 20 but the present disclosure is not limited thereto. For example, the camera 42 may be installed at a separate support or wall configured outside the main body 20. The camera 42 may be configured in a plural number.

A storage 60 may be positioned outside the main body 20. The storage 60 may store a material required for an operation of the manipulator 30.

For example, the manipulator 30 may perform cooking, and the storage 60 may be a refrigerator for storing an ingredient. The manipulator 30 may pick up or contain the material stored in the storage 60 and may perform cooking.

The storage 60 may include a remaining amount sensor 63 for detecting the amount of the material stored in the storage 60. The remaining amount sensor 63 may include at least one of a vision sensor or a weight sensor.

The storage 60 may include an inlet 61 and an opening 62. The operator may put the material into the storage 60 through the inlet 61. The manipulator 30 may pick up or contain the material stored in the storage 60 through the opening 62. The operator may take out the material stored in the storage 60 through the inlet 61 and the opening 62.

When the storage 60 is a refrigerator, the inlet 61 and the opening 62 may be opened and closed by different doors. The operator may open the door of the inlet 61 and may put the ingredient into the refrigerator. The manipulator 30 may open the door of the opening 62 and may take out the ingredient stored in the refrigerator.

The robot system according to an embodiment of the present disclosure may further include the controller 23 for controlling overall manipulation of the robot system. As described above, the controller 23 may be installed in the main body 20. However, the present disclosure is not limited thereto, and needless to say, the controller 23 may be positioned outside the main body 20.

The controller 23 may include at least one processor.

The controller 23 may communicate with the lidar sensor 24 by wire or wirelessly. The controller 23 may receive a detection result of the lidar sensor 24. The controller 23 may set a detection range of the lidar sensor 24.

The controller 23 may communicate with the camera 42 by wire or wirelessly. The controller 23 may receive image information captured by the camera 42. The controller 23 may analyze the image information. The controller 23 may change a monitoring region of the camera 42.

The controller 23 may communicate with the remaining amount sensor 63 by wire or wirelessly. The controller 23 may receive a detection value of the remaining amount sensor 63. The controller 23 may compare the detection value of the remaining amount sensor 63 with a predetermined set value.

The controller 23 may detect entry and exit of the material with respect to the storage 60 according to detection of the remaining amount sensor 63. The controller 23 may change a restricted region that will be described below according to entry and exist of the material with respect to the storage 60.

The controller 23 may communicate with the manipulator 30 by wire or wirelessly. The controller 23 may control the manipulator 30 to perform a preset operation. The controller 23 may limit a manipulation range of the manipulator 30, and the manipulator 30 may be moved only within the manipulation range.

The controller 23 may set a restricted region including the manipulator 30. The restricted region may be set based on the main body 20. The lidar sensor 24 may detect a person or an obstacle that approaches or invades the restricted region.

The controller 23 may change the restricted region.

The controller 23 may stop manipulation of the manipulator 30 when the person or the obstacle invades the restricted region. The controller 23 may re-manipulate the manipulator 30 when the person or the obstacle moves out of the restricted region.

In more detail, the controller 23 may set any one of a first region A1, a second region A2, and a third region A3 to the restricted region.

The controller 23 may set a first virtual fence VF1, a second virtual fence VF2, and a third virtual fence VF3 based on a detection range of the lidar sensor 24. The first region A1 may be defined as an internal region of the first virtual fence VF1. The second region A2 may be defined as an internal region of the second virtual fence VF2. The third region A3 may be defined as an internal region of the third virtual fence VF3.

The second virtual fence VF2 may be positioned inside the first virtual fence VF1, and may be smaller than the first virtual fence VF1. That is, the second region A2 may be included in the first region A1 and may be smaller than the first region A1.

The third virtual fence VF3 may be positioned inside the second virtual fence VF2 and may be smaller than the second virtual fence VF2. That is, the third region A3 may be included in the second region A2 and may be smaller than the second region A2.

The first region A1 may include a workstand 50 and the storage 60. The first region A1 may include the inlet 61 and the opening 62 of the storage 60.

The workstand 50 and the storage 60 may be positioned outside the main body 20. The workstand 50 and the storage 60 may be positioned at opposite sides based on the main body 20.

The second region A2 may include at least a portion of the workstand 50. The second region A2 may include the opening 62 of the storage 60 and may not include the inlet 61. That is, the second region A2 may be positioned inward from the inlet 61 of the storage 60.

The third region A3 may include the manipulator 30. The controller 23 may change the third region A3 in real time according to movement of the manipulator 30.

A first mode of the robot system may be defined as a state in which the first region A1 is set to the restricted region. A second mode of the robot system may be defined as a state in which the second region A2 is set to the restricted region. A third mode of the robot system may be defined as a state in which the third region A3 is set to the restricted region.

The controller 23 may control the robot system in any one of the first mode, the second mode, and the third mode. That is, the first mode, the second mode, and the third mode may be alternatively controlled.

The first region A1 may include a maximum manipulation range of the manipulator 30. The controller 23 may limit the manipulation range of the manipulator 30 to an internal part of the first region A1 in the first mode.

Thus, the manipulator 30 may perform a preset operation (e.g., cooking) on the workstand 50. The manipulator 30 may pick up the material stored in the storage 60 through the opening 62.

The first region A1 includes an inlet of the storage 60, and thus when the operator approaches the inlet 61 of the storage 60 in the first mode, manipulation of the manipulator 30 may be stopped.

In the second mode, the controller 23 may limit the manipulation range of the manipulator 30 to an internal part of the second region A2. Thus, the manipulator 30 may perform a preset operation (e.g., cooking) on the workstand 50. The manipulator 30 may pick up the material stored in the storage 60 through the opening 62.

The second region A2 does not include the inlet of the storage 60, and thus even if the operator approaches the inlet 61 of the storage 60 in the second mode, manipulation of the manipulator 30 may not be stopped.

In the state in which the restricted region is the first region A1, when the detection value of the remaining amount sensor 63 is smaller than the set value and the person approaching the first region A1 is verified to be an authenticated operator, the controller 23 may change the restricted region to the second region A2. That is, when the amount of the material stored in the storage 60 is less than a preset amount and the authenticated operator approaches the first region A1, the controller 23 may switch the robot system to the second mode from the first mode.

The controller 23 may check whether the person approaching the first region A1 is an authenticated operator through image information of the camera 42. When the person or the obstacle is positioned within a preset distance (e.g., 1 m) from the outside the first virtual fence VF1, the controller 23 may determine the object, such as the person or the obstacle, to "approach" the first region A1.

When the amount of the material stored in the storage 60 is less than a preset amount, the controller 23 may communicate with a terminal of the operator and may transmit a notification message.

Thus, when the material of the storage 60 is completely consumed, the operator may put the material into the storage 60 through the inlet 61, and the manipulator 30 may maintain the operation. Thus, operation efficiency of the robot system may be increased.

In contrast, in the state in which the restricted region is the second region A2, when the detection value of the remaining amount sensor 63 is greater than the set value and the operator moves out of the first region A1, the controller 23 may change the restricted region to the first region A1. That is, when the material of the storage 60 is supplemented and the operator moves out of the first region A1, the controller 23 may re-switch the robot system to the first mode from the second mode.

In the third mode, the controller 23 may limit the manipulation range of the manipulator 30 to the internal part of the second region A2. That is, compared with the second mode, the manipulation range of the manipulator 30 may be the same as in the second mode, but the operator may further approach the manipulator 30.

In the state in which the restricted region is the first region A1, when a set time elapses after the manipulator 30 starts manipulation and the person approaching the first region A1 is verified to be the authenticated operator, the controller 23 may change the restricted region to the third region A3. That is, when the manipulator 30 performs manipulation for a longer time than a preset time and the authenticated operator approaches the first region A1, the controller 23 may switch the robot system to the third mode from the first mode.

When the manipulator 30 performs manipulation for a longer time than a preset time, impurities may be accumulated around the manipulator (e.g., after a long period of use, the robot may become dirty or clogged, and be in need of servicing or maintenance).

When a preset time elapses after the manipulator 30 starts manipulation, the controller 23 may communicate with a terminal of the operator and may transmit a notification message. The controller 23 may detect impurities accumulated around the manipulator through image information of the camera 42, and when the amount of the impurities is out of a preset range, the controller 23 may communicate with the terminal of the operator and may transmit the notification message.

Thus, the operator may remove impurities around the manipulator 30, and the manipulator 30 may maintain the operation. Thus, operation efficiency of the robot system may be increased. The operator may take out the material from an internal part of the opening 62 of the storage 60.

In contrast, in the state in which the restricted region is the third region A3, when the operator moves out of the first region A1, the controller 23 may change the restricted region to the first region A1. That is, when the operator moves out of the first region A1, the controller 23 may re-switch the robot system to the first mode from the third mode.

The controller 23 may divide a region defined by excluding the second region A2 from the first region A1 to set a plurality of outer division regions A11 and A12. That is, the outer division regions A11 and A12 may be positioned between the first virtual fence VF1 and the second virtual fence VF2.

The controller 23 may divide a region defined by excluding the third region A3 from the second region A2 to set a plurality of inner division regions A21, A22, A23, and A24. That is, the inner division regions A21, A22, A23, and A24 may be positioned between the second virtual fence VF2 and the third virtual fence VF3. The plurality of inner division regions A21, A22, A23, and A24 may be separated based on the base 31 of the manipulator 30.

Hereinafter, an example in which the plurality of outer division regions A11 and A12 include a first outer division region A11 and a second outer division region A12, and the plurality of inner division regions A21, A22, A23, and A24 include a first inner division region A21 to a fourth inner division region A24 will be described.

When the operator is positioned in one of the outer division regions A11 and A12 in the second mode, the controller 23 may exclude one of the inner division regions A21, A22, A23, and A24, which neighbors the one of the outer division region A11 and A12, from the manipulation range of the manipulator 30.

For example, when the operator is positioned in the first outer division region A11 in the second mode, a third inner division region A23 adjacent to the first outer division region A11 may be excluded from the manipulation range of the manipulator 30. Thus, the manipulation range of the manipulator 30 may be the first inner division region A21, the second inner division region A22, a fourth division inner region A24, and the third region A3.

In another example, when the operator is positioned in the second outer division region A12 in the second mode, the fourth inner division region A24 adjacent to the second outer division region A12 may be excluded from the manipulation range of the manipulator 30. Thus, the manipulation range of the manipulator 30 may be the first inner division region A21, the second inner division region A22, the third inner division region A23, and the third region A3.

However, when the manipulator 30 performs a preset special operation in the second mode, the manipulation range of the manipulator 30 may not be limited. For example, when the manipulator 30 performs an operation (e.g., a dance operation) other than cooking, the manipulation range of the manipulator 30 may be maintained as the second region A2.

When the operator is positioned in one of the inner division regions A21, A22, A23, and A24 in the third mode, the controller 23 may exclude the one of the inner division regions A21, A22, A23, and A24 from the manipulation range of the manipulator 30.

For example, when the operator is positioned in the first inner division region A21 in the third mode, the first inner division region A21 may be excluded from the manipulation range of the manipulator 30. Thus, the manipulation range of the manipulator 30 may be the second inner division region A22, the third inner division region A23, the fourth division inner region A24, and the third region A3.

In another example, when the operator is positioned in the second inner division region A22 in the third mode, the second inner division region A22 may be excluded from the manipulation range of the manipulator 30. Thus, the manipulation range of the manipulator 30 may be the first inner division region A21, the third inner division region A23, the fourth division inner region A24, and the third region A3.

In another example, when the operator is positioned in the third inner division region A23 in the third mode, the third inner division region A23 may be excluded from the manipulation range of the manipulator 30. Thus, the manipulation range of the manipulator 30 may be the first inner division region A21, the second inner division region A22, the fourth division inner region A24, and the third region A3.

In another example, when the operator is positioned in the fourth inner division region A24 in the third mode, the fourth inner division region A24 may be excluded from the manipulation range of the manipulator 30. Thus, the manipulation range of the manipulator 30 may be the first inner division region A21, the second inner division region A22, the third inner division region A23, and the third region A3.

However, when the manipulator 30 performs a preset special operation in the third mode, the manipulation range of the manipulator 30 may not be limited. For example, when the manipulator 30 performs a coupling/decoupling operation of a tool changer or performs a cleaning operation, the manipulation range of the manipulator 30 may be maintained as the second region A2.

In the state in which the restricted region is the first region A1, the controller 23 may operate the manipulator 30 at a first speed (e.g., 1 m/s), and in the state in which the restricted region is the second region A2, the controller 23 may operate the manipulator 30 at a second speed (e.g., 0.5 m/s) lower than the first speed. That is, a manipulation speed of the manipulator 30 in the second mode may be lower than a manipulation speed of the manipulator 30 in the first mode. The manipulation speed of the manipulator 30 may refer to a maximum moving speed of the plurality of arms 32, 33, and 34 and the tool changer 35.

However, when the manipulator 30 performs a preset special operation in the second mode, a manipulation speed of the manipulator 30 may not be limited. For example, when the manipulator 30 performs an operation (e.g., a dance operation or an entertainment operation) other than cooking, the manipulator 30 may be operated more rapidly than the second speed.

In the state in which the restricted region is the third region A3, the controller 23 may operate the manipulator 30 at the second speed (e.g., 0.5 m/s) or may operate the manipulator 30 at a third speed (e.g., 0.25 m/s) than the second speed. That is, a manipulation speed of the manipulator 30 in the third mode may be equal to or lower than a manipulation speed of the manipulator 30 in the third mode.

In more detail, when the operator is positioned in one of the inner division regions A21, A22, A23, and A24 in the third mode and the workstand 50 or the storage 60 is positioned in the one of the inner division regions A21, A22, A23, and A24, the controller 23 may operate the manipulator 30 at the second speed. In contrast, when the workstand 50 or the storage 60 is positioned outside the one of the inner division regions A21, A22, A23, and A24, the controller 23 may operate the manipulator 30 at the third speed.

For example, when the operator is positioned in the first inner division region A21 in which the workstand 50 is positioned or is positioned in the second inner division region A22 in which the storage 60 is positioned, the controller 23 may operate the manipulator 30 at the second speed. When the operator is positioned in the third inner division region A23 or the fourth inner division region A24, the controller 23 may operate the manipulator 30 at the third speed.

However, when the manipulator 30 performs a preset special operation in the third mode, a manipulation speed of the manipulator 30 may not be limited. For example, when the manipulator 30 performs a coupling/decoupling operation of a tool changer or performs a cleaning operation, the manipulator 30 may be operated more rapidly than the second speed.

Figure 7:
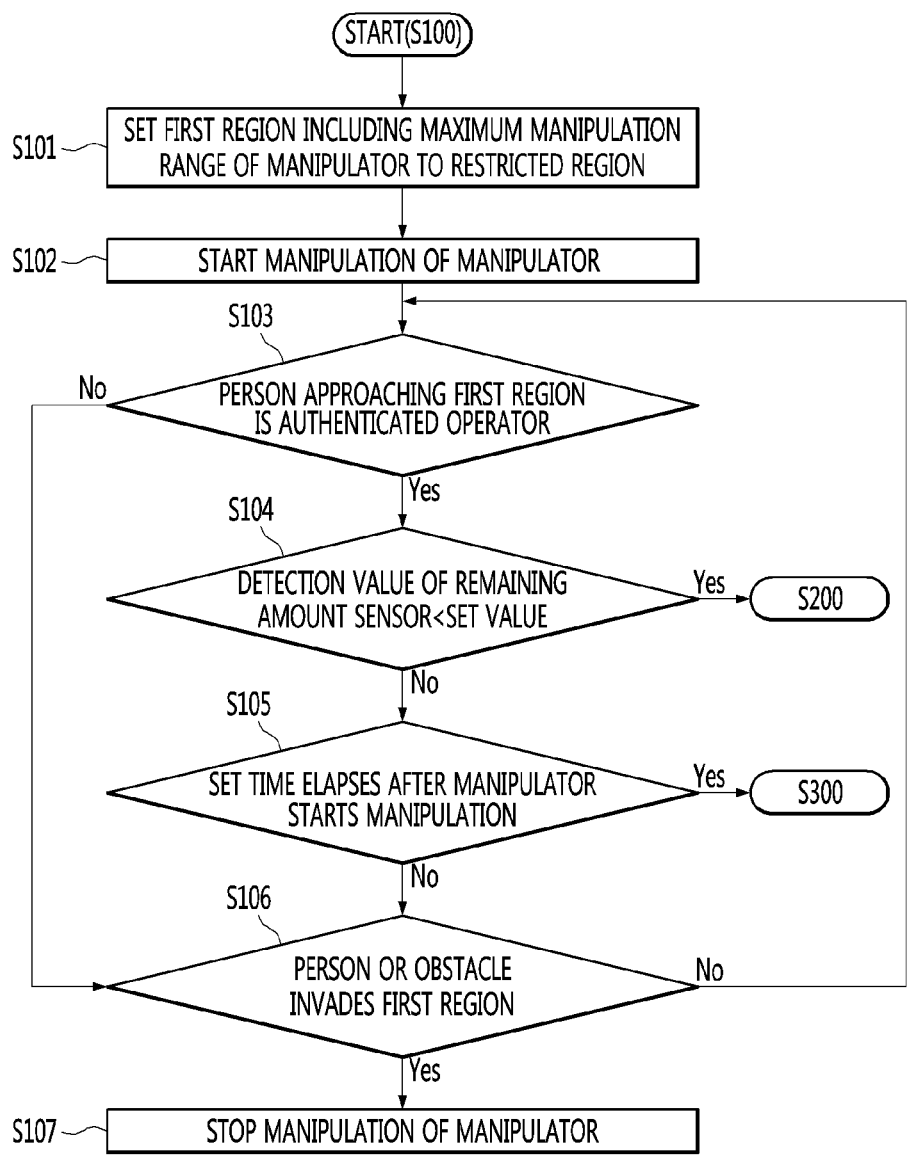
FIG. 7 is a schematic flowchart showing a sequence of a first mode of a robot system according to an embodiment of the present disclosure.

FIG. 7 is a schematic flowchart showing a sequence of a first mode of a robot system according to an embodiment of the present disclosure.

The robot system may be controlled in a first mode S100 at ordinary time. When an on-command is input to the robot system, the robot system may start an operation in the first mode S100.

Hereinafter, a control method of the robot system in the first mode S100 will be described.

The controller 23 may set the first region A1 including a maximum manipulation region of the manipulator 30 to a restricted region (S101) and may start manipulation of the manipulator 30 (S102). When the robot system is re-switched to the first mode from the second mode or the third mode, the controller 23 may maintain manipulation of the manipulator 30.

When a person or an obstacle approaches the first region A1, the lidar sensor 24 may detect the approach and may transmit a signal to the controller 23. The controller 23 may determine whether the person approaching the first region A1 is an authenticated operator through image information of the camera 42 (S103).

When the person or the obstacle that is not the authenticated operator approaches the first region A1 as the restricted region, the controller 23 may stop manipulation of the manipulator 30 (S107).

When the person approaching the first region A1 is the authenticated operator, the controller 23 may determine whether the detection value of the remaining amount sensor 63 is less than a predetermined set value (S104).

When the detection value of the remaining amount sensor 63 is less than the predetermined set value, the controller 23 may control the robot system in a second mode S200.

When the detection value of the remaining amount sensor 63 is equal to or greater than the predetermined set value, the controller 23 may determine whether a set time elapses after the manipulator 30 starts manipulation (S105).

When the set time elapses after the manipulator 30 starts manipulation, the controller 23 may control the robot system in a third mode S300.

Before the set time elapses after the manipulator 30 starts manipulation, the controller 23 may maintain the robot system in the first mode S100. That is, when the person or the obstacle invades the first region A1 that is the restricted region, the lidar sensor 24 may detect the approach and may transmit a signal to the controller 23, and the controller 23 may stop manipulation of the manipulator 30 (S107).

Figure 8:
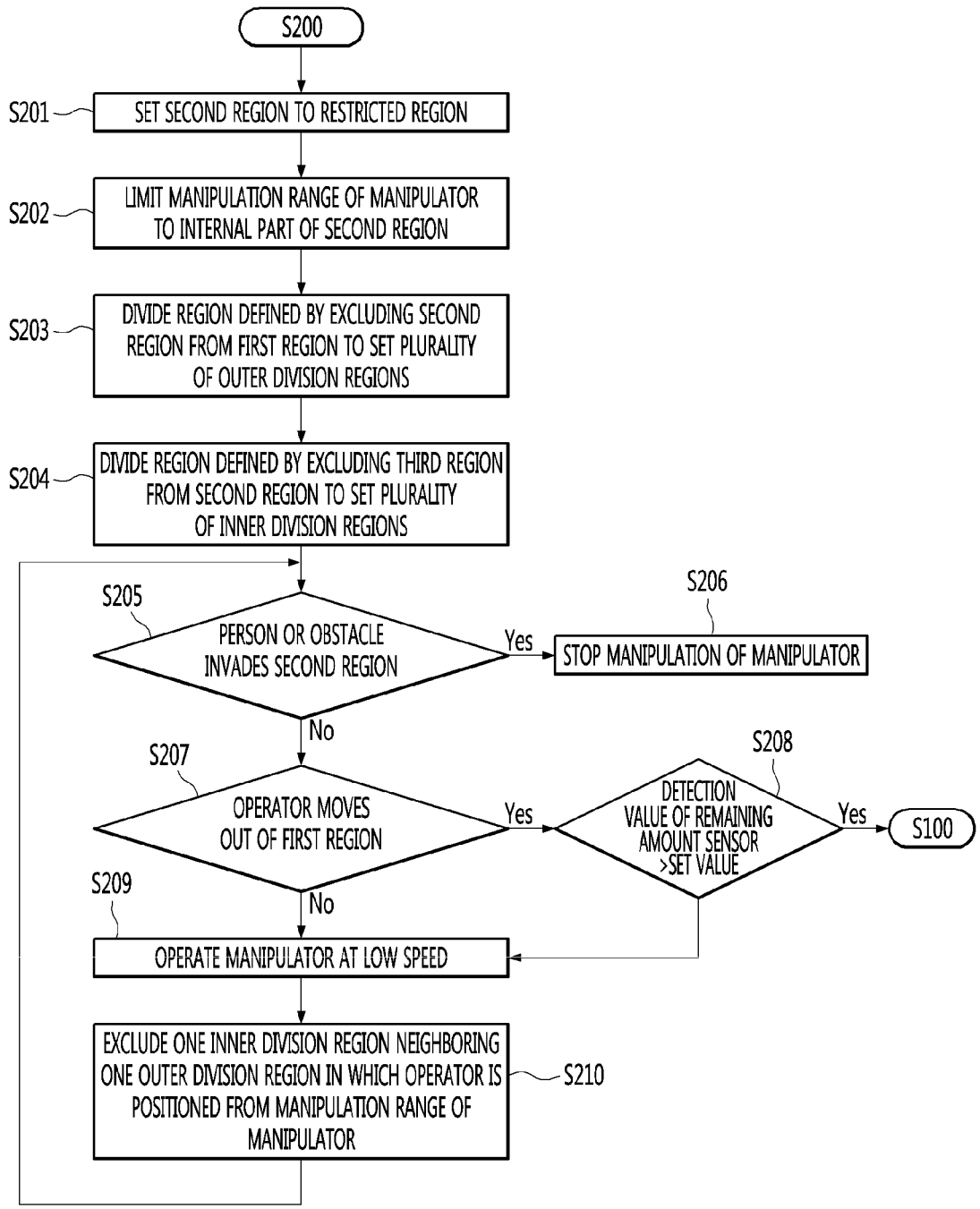
FIG. 8 is a schematic flowchart showing a sequence of a second mode of a robot system according to an embodiment of the present disclosure.

FIG. 8 is a schematic flowchart showing a sequence of a second mode of a robot system according to an embodiment of the present disclosure.

Hereinafter, a control method of a robot system in the second mode S200 will be described.

The controller 23 may set the second region A2 to the restricted region (S201) and may limit the manipulation range of the manipulator 30 to the internal part of the second region A2 (S202).

The controller 23 may divide a region defined by excluding the second region A2 from the first region A1 to set the plurality of outer division regions A11 and A12 (S203), and may divide a region defined by excluding the third region A3 from the second region A2 to set the plurality of inner division regions A21, A22, A23, and A24 (S204).

As described above, one of entrance conditions of the second mode S200 may correspond to the situation in which the authenticated operator approaches the first region A1. The restricted region is the second region A2 in the second mode S200, and thus even if the operator enters the first region A1, manipulation of the manipulator 30 may be maintained.

When the operator invades the second region A2 that is the restricted region, the lidar sensor 24 may detect invasion and may transmit a signal to the controller 23, and the controller 23 may stop manipulation of the manipulator 30 (S205 and S206).

When the operator moves out of the first region A1 and detection value of the remaining amount sensor 63 is greater than the set value, the controller 23 may control the robot system in the first mode S100 (S205, S207, and S208).

When the operator is positioned in the outer division regions A11 and A12, the controller 23 may control manipulation of the manipulator 30 at low speed (S205, S207, and S209). The low speed may refer to the aforementioned second speed.

Even if the operator moves out of the first region A1, the detection value of the remaining amount sensor 63 is equal to or less than the set value, the controller 23 may control manipulation of the manipulator 30 at low speed (S205, S207, S208, and S209).

The controller 23 may exclude one of inner division regions A21, A22, A23, and A24, neighboring one of the outer division regions A11 and A12, in which the operator is positioned, from the manipulation range of the manipulator 30 (S210).

The robot system may be continuously maintained in the second mode S200 until returning to the first mode S100.

Figure 9:
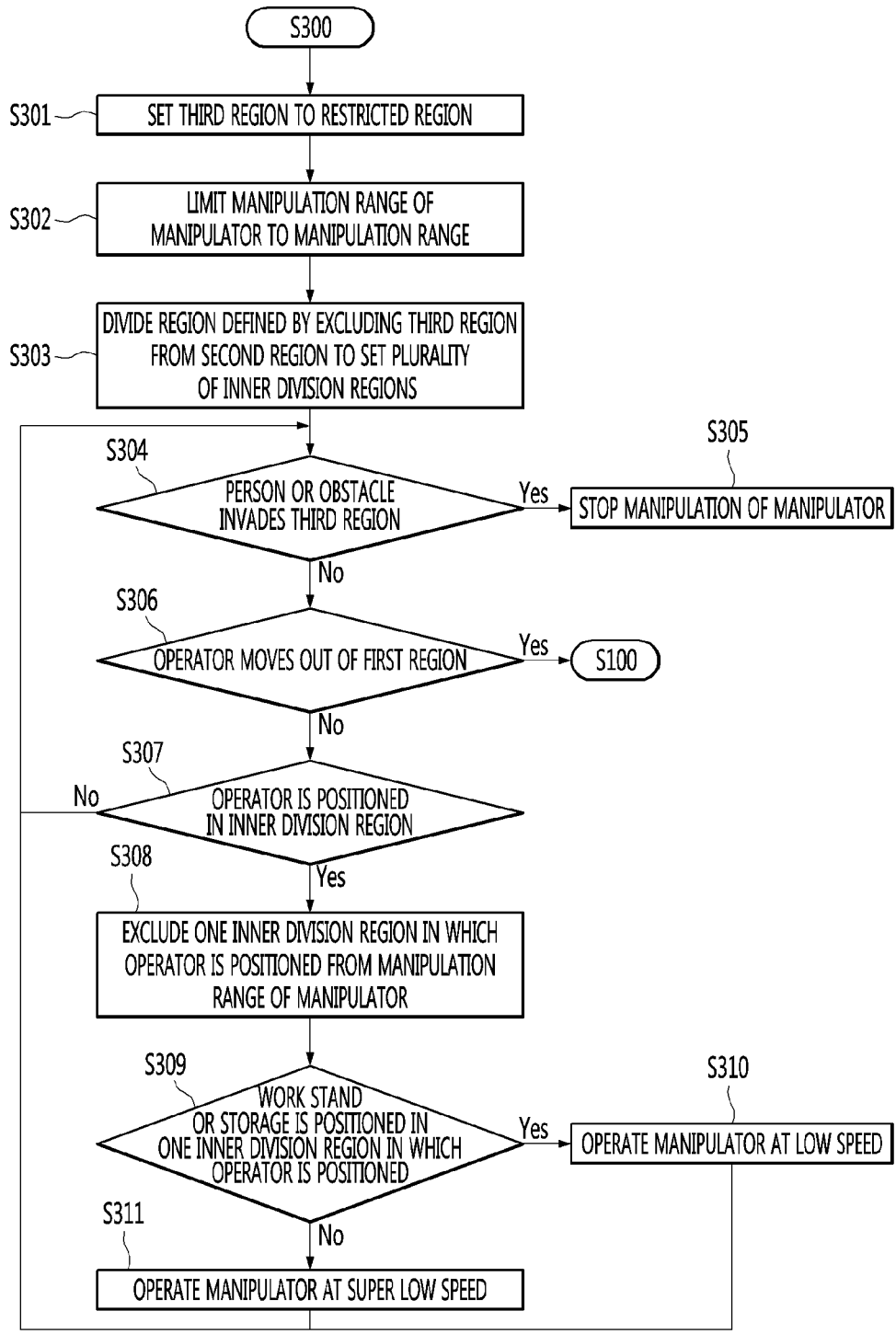
FIG. 9 is a schematic flowchart showing a sequence of a third mode of a robot system according to an embodiment of the present disclosure.

FIG. 9 is a schematic flowchart showing a sequence of a third mode of a robot system according to an embodiment of the present disclosure.

Hereinafter, a control method of a robot system in the third mode S300 will be described.

The controller 23 may set the third region A3 to the restricted region (S301) and may limit the manipulation range of the manipulator 30 to the internal part of the second region A2 (S302).

The controller 23 may divide a region defined by excluding the third region A3 from the second region A2 to set the plurality of inner division regions A21, A22, A23, and A24 (S303).

As described above, one of entrance conditions of the third mode S300 may correspond to the situation, in which the authenticated operator approaches the first region A1. The restricted region is the third region A3 in the third mode S300, and thus even if the operator enters the second region A2, manipulation of the manipulator 30 may be maintained.

When the operator invades the third region A3 that is the restricted region, the lidar sensor 24 may detect invasion and may transmit a signal to the controller 23, and the controller 23 may stop manipulation of the manipulator 30 (S304 and S305).

When the operator moves out of the first region A1, the controller 23 may be control the robot system in the first mode S100 (S304 and S306).

When the operator is positioned in the outer division regions A11 and A12, the controller 23 may return to operation S304 of determining whether the operator invades the third region A3.

When the operator is positioned in the inner division regions A21, A22, A23, and A24, the controller 23 may exclude one of the inner division regions A21, A22, A23, and A24, in which the operator is positioned, from the manipulation range of the manipulator 30 (S308).

When the workstand 50 or the storage 60 is positioned in the one of the inner division regions A21, A22, A23, and A24, the controller 23 may control manipulation of the manipulator 30 at low speed (S309 and S310). The low speed may refer to the aforementioned second speed.

When the workstand 50 or the storage 60 is not positioned in the one of the inner division regions A21, A22, A23, and A24, the controller 23 may control manipulation of the manipulator 30 at super low speed (S309 and S311). The low speed may refer to the aforementioned third speed.

The robot system may continuously maintain the third mode S300 until returning to the first mode S100.

According to exemplary embodiments of the present disclosure, when the manipulator may perform manipulation in the restricted region and a person or an obstacle invades the restricted region, manipulation of the manipulator may be stopped, thereby preventing risk that the person collides with the manipulator and is injured and the manipulator collides with the obstacle and malfunctions or is damaged.

Depending on the type of situation, the restricted region is changed, and thus manipulation of the manipulator may be prevented from being unnecessarily stopped. Thus, operation efficiency of the manipulator may be increased.

The first region includes the inlet of the storage, and thus an operation that is not authenticated may be prevented from approaching the storage.

When the remaining amount of the material of the storage is low, if an authenticated operator approaches the first region, the restricted region may be changed to the second region positioned inward from the inlet of the storage. Thus, the operator may easily supplement the storage with the material.

When the restricted region is narrowed, a manipulation speed of the manipulator may be lowered. Thus, risk that the manipulator and the operator collide may be minimized.

A division region in which the operator is positioned or a division region adjacent thereto may be excluded from the manipulation range of the manipulator. Thus, risk that the manipulator collides with the operator may be further reduced.

When the manipulator performs manipulation for a sufficiently long time, if the authenticated operator approaches the first region, the restricted region may be changed to the third region including the manipulator. Thus, the operator may easily remove impurities around the manipulator.

The third region may be changed in real time according to movement of the manipulator. Thus, operation efficiency of the manipulator may be further increased.

While the present disclosure has been particularly shown and described with reference to exemplary embodiments thereof, it will be understood by those skilled in the art that various changes in form and details may be made therein without departing from the spirit and scope of the disclosure as defined by the appended claims.

Accordingly, the exemplary embodiments should be considered in descriptive sense only and not for purposes of limitation. The scope of the disclosure is defined not by the detailed description of the disclosure but by the appended claims, and all differences within the scope will be construed as being included in the present disclosure.

What is claimed is:

1. A robot system comprising:
a main body;
a manipulator installed on the main body;
a sensor configured to detect an object approaching a restricted region including the manipulator;
a camera configured to monitor the restricted region and the object approaching the restricted region;
a storage configured to store a material for an operation of the manipulator, the storage including an inlet for receiving the material;
a remaining amount sensor configured to detect an amount of the material remaining in the storage; and
a controller configured to:
  change the restricted region based on at least one of a result of detection of the remaining amount sensor and image information of the camera, and
  in response to the sensor detecting that the object is within the restricted region, stop manipulation of the manipulator,
wherein the controller is further configured to:
set the restricted region to a first region, the first region including the inlet of the storage, and
when the amount of the material in the storage is less than a set value and the object approaching the first region is verified to be an authenticated operator through the camera, set the restricted region to a second region, the second region being smaller than the first region and inwardly spaced apart from the inlet of the storage.

2. The robot system of claim 1, wherein the controller is further configured to:
when the amount of the material in the storage is greater than the set value and the authenticated operator moves out of the first region, change the restricted region from the second region to the first region.

3. The robot system of claim 1, wherein the controller is further configured to:
operate the manipulator according to a first speed while the restricted region is set to the first region, and
operate the manipulator according to a second speed lower than the first speed while the restricted region is set to the second region.

4. The robot system of claim 1, wherein the controller is further configured to:
limit a manipulation range of the manipulator to stay within the second region while the restricted region is set to the second region.

5. The robot system of claim 1, wherein the controller is further configured to:
divide an outer portion of the first region into a plurality of outer division regions, the outer portion excluding the second region,
divide an inner portion of the first region into a plurality of inner division regions, the inner portion excluding the outer portion and a third region including the manipulator, the third region being smaller than the second region, and
when the authenticated operator is located within one of the plurality of outer division regions while the restricted region is set to the second region, limit a manipulation range of the manipulator to exclude one of the plurality of inner division regions.

6. The robot system of claim 1, wherein the controller is further configured to:
when a predetermined time period has expired after the manipulator starts manipulation and the object approaching the restricted region is verified to be the authenticated operator through the camera while the restricted region is set to the first region, change the restricted region from the first region to a third region smaller than the second region.

7. The robot system of claim 6, wherein the controller is further configured to:
when the authenticated operator moves out of the first region while the restricted region is set to the third region, change the restricted region from the third region to the first region.

8. The robot system of claim 6, wherein the controller is further configured to:
when the restricted region is set to the third region, limit a manipulation range of the manipulator to stay within the second region.

9. The robot system of claim 6, wherein the controller is further configured to:
adjust a size of the third region in real time based on a movement of the manipulator.

10. The robot system of claim 6, wherein the controller is further configured to:
divide the second region into a plurality of division regions, the plurality of division regions excluding the third region, and
when the authenticated operator is located within one of the plurality of division regions while the restricted region is set to the third region, limit a manipulation range of the manipulator to exclude the one of the plurality of division regions or another one of plurality of division regions.

11. The robot system of claim 10, wherein the controller is further configured to:
operate the manipulator according to a first speed while the restricted region is set to the first region,
operate the manipulator according to a second speed lower than the first speed while the restricted region is set to the third region and a workstand of the robot or the storage is located inside of the one of the plurality of division regions, and
operate the manipulator according to a third speed lower than the second speed while the restricted region is set to the third region and the workstand of the robot system or the storage is located outside of the one of the plurality of division regions.

12. A control method of a robot system, the method comprising:
setting a restricted region of a manipulator of the robot system to a first region including an inlet of a storage for receiving material for an operation of the manipulator;
in response to an object approaching the first region coming within the restricted region while the restricted region is set to the first region, stopping manipulation of the manipulator;
when an amount of the material remaining in the storage is less than a set value and the object approaching the first region is verified to be an authenticated operator through a camera of the robot system, setting the restricted region to a second region, the second region being smaller than the first region and inwardly spaced apart from the inlet of the storage; and
in response to the authenticated operator coming within the restricted region while the restricted region is set to the second region, stopping the manipulation of the manipulator.

13. The method of claim 12, further comprising:
dividing an outer portion of the first region into a plurality of outer division regions, the outer portion excluding the second region;
dividing an inner portion of the first region into a plurality of inner division regions, the inner portion excluding the outer portion and a third region including the manipulator, the third region being smaller than the second region; and
when the authenticated operator is located within one of the plurality of outer division regions while the restricted region is set to the second region, limiting a manipulation range of the manipulator to exclude one of the plurality of inner division regions.

14. The method of claim 12, further comprising:
when a predetermined time period has expired after the manipulator starts manipulation and the object approaching the restricted region is verified to be an authenticated operator through the camera while the restricted region is set to the first region, changing the restricted region from the first region to a third region smaller than the second region; and
when the object moves into the third region while the restricted region is set to the third region, stopping the manipulation of the manipulator.

15. The method of claim 14, further comprising:
limiting a manipulation range of the manipulator to stay within the second region while the restricted region is set to the second region or the third region.

16. The method of claim 14, further comprising:
adjusting a size of the third region in real time based on a movement of the manipulator.

17. The method of claim 14, further comprising:
dividing the second region into a plurality of division regions, the plurality of division regions excluding the third region; and
when the authenticated operator is located within one of the plurality of division regions while the restricted region is set to the third region, limiting a manipulation range of the manipulator to exclude the one of the plurality of division regions or another one of plurality of division regions.

18. The method of claim 17, further comprising:
operating the manipulator according to a first speed while the restricted region is set to the first region;
operating the manipulator according to a second speed lower than the first speed while the restricted region is set to the second region;
operating the manipulator according to the second speed when a workstand of the robot system or the storage is located inside the one of the plurality of division regions while the restricted region is set to the third region; and
operate the manipulator according to a third speed lower than the second speed while the restricted region is set to the third region and the workstand or the storage is located outside of the one of the plurality of division regions.

* * * * *